June 24, 1969   M. G. M. J. DU PLESSIX   3,451,850
ELECTROCHEMICAL GENERATOR OF LOW COLLISION IMPACT ENERGY
Filed Jan. 29, 1968

INVENTOR
MICHEL GUY MARIE JOCHAUD du PLESSIX
BY
ATTORNEYS

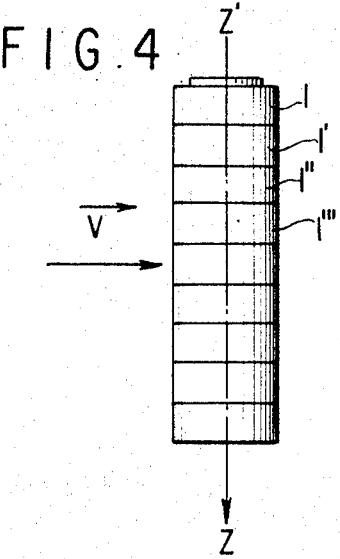
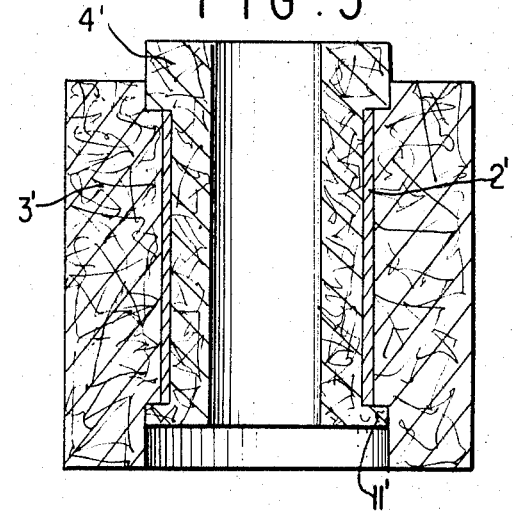
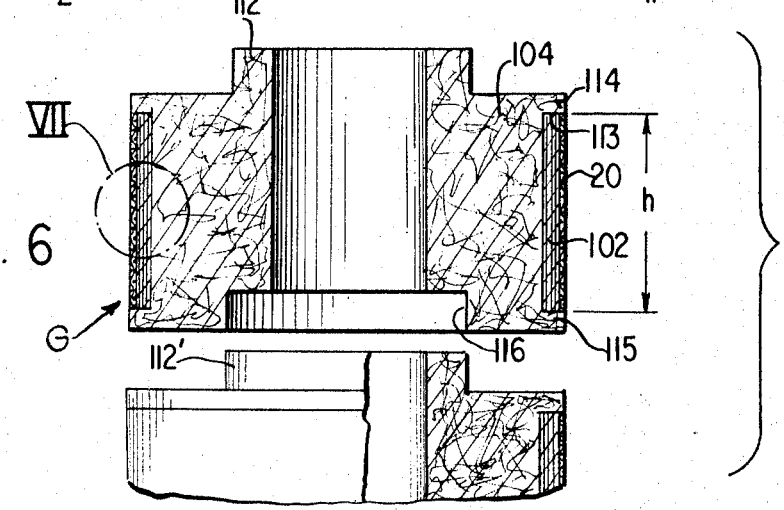
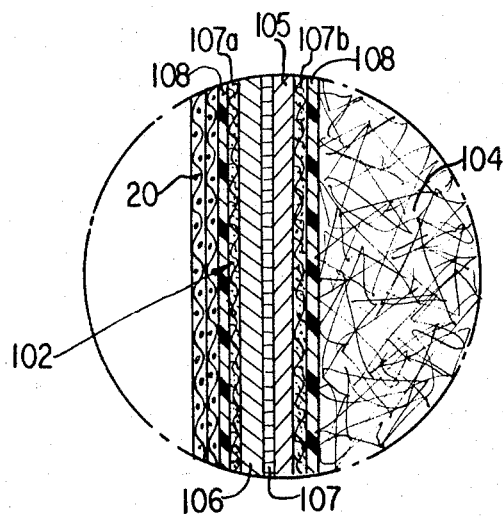

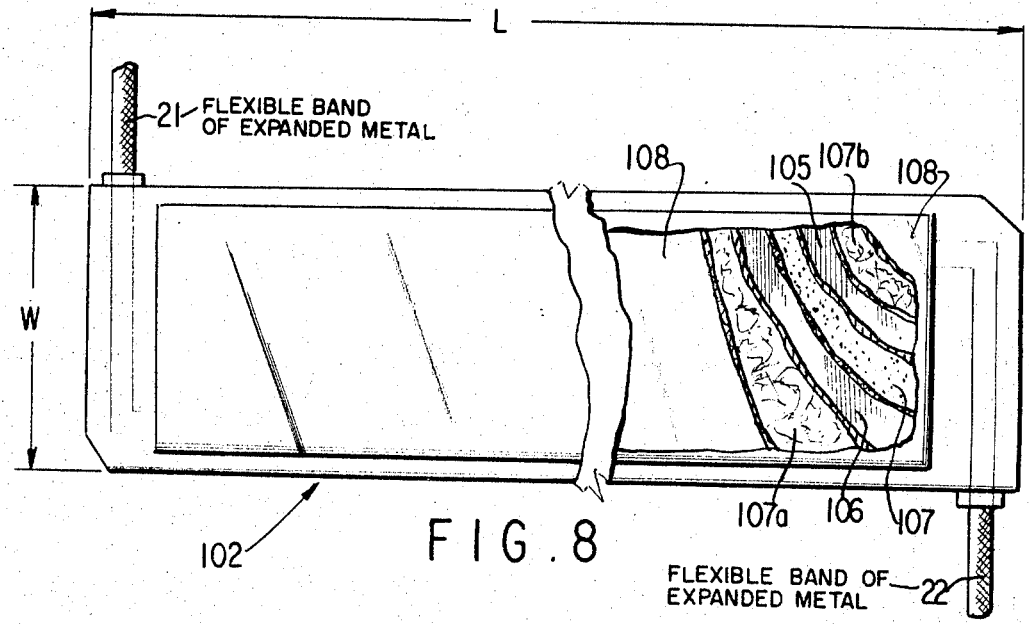
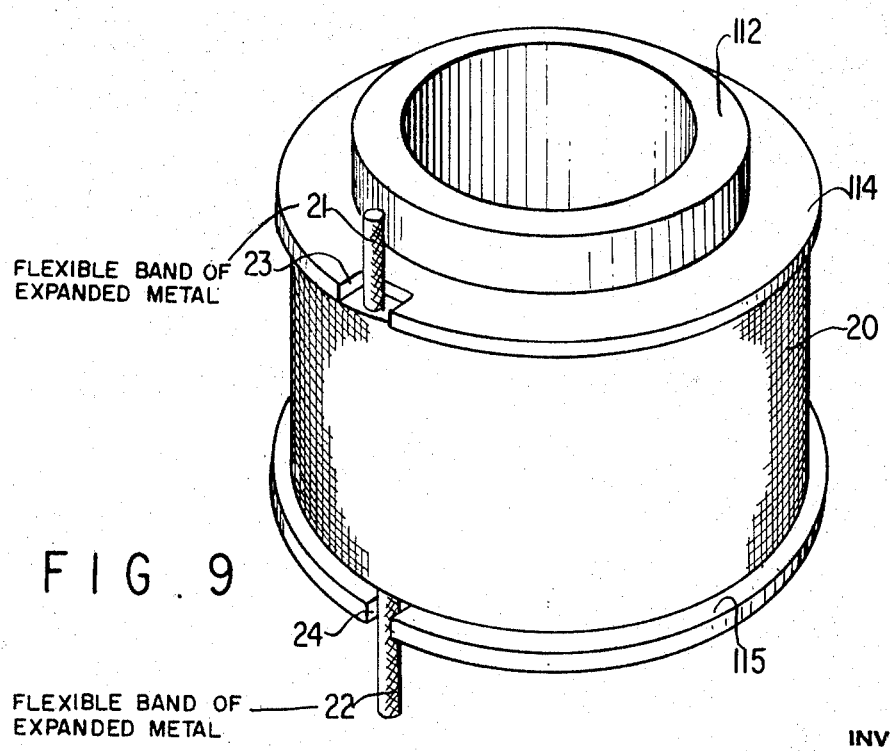

United States Patent Office 3,451,850
Patented June 24, 1969

3,451,850
ELECTROCHEMICAL GENERATOR OF LOW COLLISION IMPACT ENERGY
Michel Guy Marie Jochaud du Plessix, Paris, France, assignor to Societe des Accumulateurs Fixes et de Traction (Societe Anonyme), Folie-Romainville, France, a company of France
Filed Jan. 29, 1968, Ser. No. 701,444
Claims priority, application France, Feb. 6, 1967, 93,807; Dec. 29, 1967, 134,357
Int. Cl. H01m 35/16, 1/02
U.S. Cl. 136—6
18 Claims

ABSTRACT OF THE DISCLOSURE

Electrochemical cells of low collision impact energy designed for use especially in suspension in sounding balloons operating at high altitudes to reduce to negligible the danger of collision impact damage to high altitude aircraft, including concentric inner and outer relatively rigid cylinders of low specific density, for example, synthetic foam, between which thin electrodes, separator and electrolyte enclosed in a flexible envelope and forming an electrochemical cell surround the inner cylinder, being maintained under uniform pressure thereon by the outer cylinder which latter also may comprise plastic synthetic tape rather than a foam frame, leads from each individual generator cell extending externally of the envelope for electrical connection, a plurality of such cell assemblies being stackable in superposed relationship for vertical suspension and being interconnected to form a battery of light weight low collision impact energy. Heating means for the cells as by current from solar cells is also provided.

There are no related applications of applicant co-pending.

---

The present invention essentially relates to an electrochemical generator more particularly intended to be used on sounding balloons travelling at high altitude, for example, used for weather forecasts. In such zones, the atmospheric pressure is naturally very reduced (below 300 millibars) and the temperature is very low (below —50° C.). The electrochemical generators working in such environmental conditions are then advantageously constituted by sealed alkaline secondary cells.

At these high altitudes, sounding balloons are practically motionless in relation to the surrounding medium. But these zones are also generally used by intercontinental aircrafts, flying at very high speeds (for example, mach 1 or more).

Comparatively to the sounding balloon, the speed of such aircrafts is therefore very high and therefore the shock resulting from a possible collision between a fast aircraft and a sounding balloon may lead to important consequences representing an actual hazard for flying aircrafts. Among all the component parts of the sounding balloons the concern herein is only with the battery.

The action of the impact results from the variation of the vis viva during the impact and is essentially localized at the contact of the two surfaces. This variation of vis viva is proportional on the one hand to the square of the relative speed which practically only depends on the aircraft speed, and on the other hand to the mass of the battery affected by the impact. In order to minimize the effect of this action, it is advantageous to use a battery whose mass affected by the shock is as small as possible and to provide a contact surface area as large as possible.

An object of the present invention is to provide such batteries and methods of their manufacture.

According to the invention, the mass of the battery affected by the impact is reduced by giving the bulk of the battery such a low cohesion that at the moment of the impact, instead of the whole mass of the battery the sole fraction of the mass concerned in the variation of vis viva corresponds approximately to the mass of a cylinder having the contact surface as base and generatrices parallel to the direction of the relative speed. To this end, the electrochemical generator according to the invention is more especially remarkable in that it comprises a small number of electrode plates of opposite polarity provided with separators and arranged in such a way that they present a large apparent surface area in relation to their volume, a sealed flexible envelope containing the said electrodes, their separators and the electrolyte, and a rigid frame engaging both opposite outer surfaces of the said flexible envelope, the said frame being made of a very low density material, of the expanded synthetic material type such as a stiff polyethylene or polyurethan foam, for example.

According to another feature of the invention and to one embodiment, the electrodes, their separators and the said envelope are given the shape of a hollow cylinder, the above mentioned frame being constituted by two respectively inner and outer cylinders coaxial to the said hollow cylinder, enclosing the said envelope between them.

A battery according to the invention differs from the general design aiming at power-to-weight or power-to-volume ratios of the highest possible value. Hanging from sounding balloons, such general batteries would constitute a rear danger for aircrafts flying at high altitudes since their whole mass should be concerned in the variation of vis viva at the moment of the impact.

In the normal working position, the generator according to the invention hangs from the sounding balloon so that the common axes of the cylinder are vertical. With such a design it is easy to obtain an electrochemical generator providing a very low collision impact action, i.e. having the lowest possible variation of vis viva. Advantageously, the cross-section of the above mentioned cylinders is annular. This design confers the maximum stiffness to the generator and also makes its assembly easier.

According to another feature of the invention, the generator being of the secondary type, an automatic charging device is provided by the means of solar cells; when the temperature of the generator stays above a given value, for example, approximately —30° C. the generator will be kept in a fully charged state by said device, whereas when the temperature drops below this value the current from the solar cells will be directed into a heating circuit, preferably constituted by a printed circuit and placed, for example, between the outer surface of the above-mentioned envelope and the adjacent wall of the frame made of foamed synthetic material. As the formed synthetic material is an excellent thermal insulator, the secondary cells will be very quickly heated by the current from the solar cells in the printed circuit when the temperature drops below the predetermined value, so that they will permanently and correctly operate, and as a result so will the testing and monitoring apparatus carried by the sounding balloon and operated by the battery of the invention. Automatic switching effects change-over.

According to the embodiment so far described, in order to obtain the correct spacing between the electrodes which have to be kept closely together, the electrode and separator strips contained in their sealed envelope are wound around a first hollow cylinder constituting one part of the above mentioned frame, and the assembled unit is compressed inside a second hollow cylinder constituting the other or outer part of the said frame.

A further object of the invention is to improve generators of low impact energy such as above described, so that these generators become even more harmless towards aircrafts flying at high speed and accidentally colliding with them, while making their manufacturing easier.

These objects are achieved according to the further improvement by using for the above mentioned rigid frame a cylinder, preferably hollow, and by maintaining the electrode and separator strips contained in their sealed envelope, externally compressed against the outer wall of the said cylinder which constitutes the core of the generator, by means of a tight flexible resistant strip which surrounds the said envelope in order to maintain the electrode and separator strips close together.

In other words, compared to the first embodiment described above, its outer rigid annular cylinder is replaced by the said tight flexible resistant strip.

If this strip is made, for example, of a fabric or a reinforced synthetic material preferably coated on one side with an adhesive it may be seen that the mass affected by the impact will be even lower, since the fabric strip can naturally be lighter than the aforesaid outer rigid cylinder. However, this strip which must be of material that is substantially inextensible only in the range of differential pressure variations occurring during the normal operation of the cell, and which will keep the electrode and separator strips contained in their sealed envelope in perfect engagement and pressed against the core.

Moreover, it may be seen that such an embodiment is much easier to produce because it requires no outer rigid cylinder, e.g. molded in situ.

Advantageously, the said core of the latter embodiment may have the shape of a pulley with a wide flat groove, in which are held the wound electrode and separator strips contained in their sealed envelope and surrounded by the aforesaid flexible strip. Such an arrangement not only facilitates the correct positioning of the various components, but also permits a very accurate fitting of the electrode and separator strips contained in their sealed envelope engaging the rigid core.

Other objects and features of the invention will become apparent from the following detailed description and the accompanying drawings, forming a part hereof and presented only as examples, and wherein:

FIGURE 1 is a non-scalar view of a longitudinal section taken along the line 1—1 of FIGURE 2 of one embodiment of an electrochemical generator according to the invention;

FIGURE 4 shows diagrammatically the relative position of a battery of electrochemical generators according to the invention hanging from a sounding balloon, and of the speed vector of an aircraft striking the battery;

FIGURE 5 is a view similar to FIGURE 1 showing another embodiment;

FIGURE 6 is a longitudinal section of a generator according to a further embodiment and diagrammatically showing how the said generator can be stacked on and fitted to an adjacent similar generator;

FIGURE 7 shows in a larger scale the details in section encircled at VII in FIGURE 6;

FIGURE 8 shows the electrode and separator strips of the latter embodiment contained in their sealed envelope to constitute the cell of the type shown in FIGURE 6, and FIGURE 9 is a perspective view of the generator of the last-mentioned embodiment.

Figure 2:
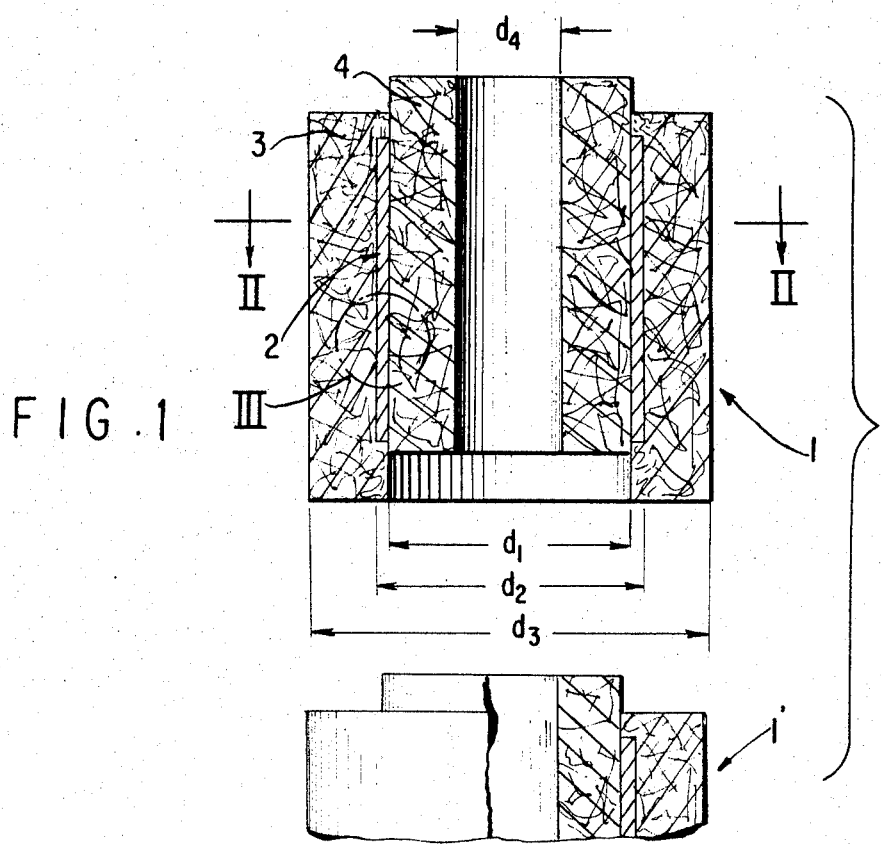
FIGURE 2 is a cross-section taken along the plane of line II—II of FIGURE 1.
Figure 3:
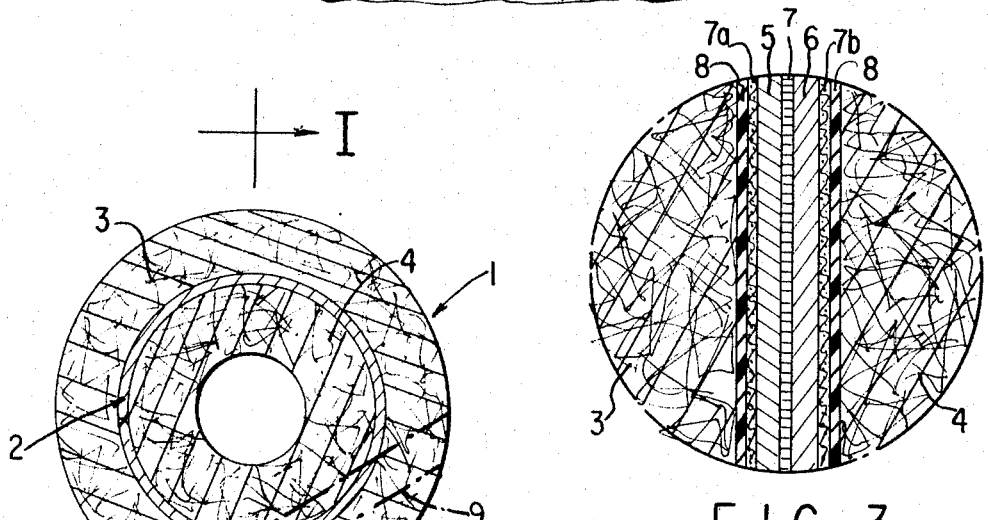
FIGURE 3 shows on a magnified scale the details in section encircled at II in FIGURE 1.

According to the embodiment illustrated in FIGS. 1-4 of the drawings, an electrochemical generator 1 in accord with the invention essentially comprises three coaxial hollow cylinders, respectively, 2, 3 and 4, the generator being intended to hang from the sounding balloon (not illustrated) in such a way that the common axes of cylinders 2, 3 and 4 are parallel to the vertical axis z–z' (FIG. 4) at this time.

The cylinder 2 constitutes the active part of the electrochemical generator. According to the illustrated embodiment, it comprises at best seen in FIG. 3, a positive electrode 5, a negative electrode 6, at least one layer of separator material 7 between the electrodes and may also comprise two porous and insulating layers $7a$ and $7b$ placed on the outer sides of the electrodes and thus able to store electrolyte therein, and outer layers 8 of a plastic envelope made, for example, of polyethylene, polyamid or PVC, i.e. a synthetic material capable of withstanding low temperatures and of forming a sealed envelope for the generator.

Outer and inner cylinders 3 and 4 are made of a foamed synthetic material, for example, a polyurethan or polystyrene foam.

Advantageously, the cross sections of cylinders 2, 3 and 4 have an annular shape, as shown. Cylinder 2 may be made by piled up flat strips of separator material and electrodes which are enclosed in the sealed plastic envelope 8 through which the cell leads extend and which are sealingly embedded therein after the required amount of electrolyte has been added to the envelope, the flat cell thus assembled being bent afterwards so as to form the hollow and not quite closed cylinder 2. Additionally, cylinders 3 and 4 are slightly shifted relative to each other along the axial line so that the ends of adjacent generators, 1, 1' etc. can fit in each other, the lower part of generator 1 covering the upper part of generator 1' immediately below (see FIG. 1). In this way, successive generators 1, 1', 1'', 1''' etc. (FIGURE 4) can be piled or stacked up and advantageously adhered together.

For a satisfactory operation of the cells, the spacing between electrodes must be kept constant at an accurately fixed value. This spacing between electrodes is preferably about 0.2 mm. Therefore, it is easy to understand that the rigid frames 3 and 4 must strongly engage and hold the cylinder 2 which lies between them. This can be perfectly achieved because of the stiffness of foamed synthetic materials of the inner and outer frame cylinders 3 and 4.

Cylinder 9 substantially corresponds to the impact cylinder defining the mass affected by the variation of vis viva when an aircraft flying at speed $\overrightarrow{V}$ (FIGURES 2 and 4) collides with a battery of said generators 1, 1' etc.

The following specifications relate to one embodiment comprising a pile of ten series-connected generators each being a nickel-cadmium cell with sintered electrodes, each cell being 32 mm. high, and the overall battery height being 350 mm.:

thickness of each positive electrode (5) 0.7 mm.;
thickness of each negative electrode (6) 0.6 mm.;
thickness of each plastic envelope (8) 0.2 mm.;
inner diameter of cylinder 4, $d4=28$ mm.;
outer diameter of cylinder 4, $d1=60$ mm.;
inner diameter of cylinder 3, $d2=65.5$ mm.;
outer diameter of cylinder 3, $d3=97$ mm.;

The coaxial cylinders must be very accurately adjusted and are readily assembled provided that the cylinder 4 is used during assembly at a lower temperature than that of cylinder 3, according to a conventional assembling technique used for assembling motor jackets.

Alternatively, the cylinder 3 may be molded over the set of cylinders 4 and 2 if needed without any sticking between the various cylinders; the berth of the battery is formed in this case by the hollow diameted $d2$ of the inner wall of cylinder 3, as shown in FIGURE 1. The material constituting the cylinder 3 expands and suitably compresses the cell components to insure regulating of spacing.

According to another embodiment diagrammatically shown in FIGURE 5, the inner cylinder 4' is provided with a cavity 11' in whose depth cell electrodes, separator and envelope are wound and kept in place by the means of an adhesive tape, for example. During the molding in situ of cylinder 3' the foamed material fills up the whole free space so that cylinders 3' and 4' are practically locked together.

Many modifications can be developed on the basis of the above described embodiments.

More particularly, more than two superposed electrodes such as 5 and 6 can be used, each being thinner and lighter, for example; also, two electrodes such as 5 and 6 can also be spirally wound into several turns so that the electrochemical active surface area is larger.

Moreover, various kinds of electrodes may be used, particularly as the operating discharge rates are low (within the range $C/10$ to $C/500$, for example, where C is rated capacity in ampere hours), the carriers of the electrodes, instead of being made of sintered metal, can be merely felted fabrics made of synthetic or similar material either plated or not and impregnated with electrochemically active positive and negative materials.

The envelope 8 forming the sealed enclosure of the cell is advantageously constituted of an impervious plastic sheet, such as polyamid, polyethylene, polypropylene or the like. In one embodiment, Mylar (polyethylene terephthalate) has successfully been used for the envelope.

In addition to the very small mass affected by an impact on an electrochemical generator according to the invention, and to the great rigidity of the thus obtained structure necessary for the good operation of the battery, cylinders 3 and 4 behave advantageously as thermal insulating layers which promote the good operation of the battery subjected to very low and unfavorable outer temperatures.

Advantageously, a heating device can be provided, for example, constituted by a printed circuit (not shown) located between the outer surfaces of the envelope 8 and the adjacent walls of frames 3 and 4, in order to warm up the battery, should the temperature of the battery drop below a predetermined value, e.g. of about −30° C. Advantageously, the current consumed in the heating circuit is directly supplied from the solar cells in the balloon which also function for the permanent charging of the battery. In this case, a simple automatic thermostatic switch in the balloon will serve to direct the current from the solar cells either to the heating circuit or to the battery charging circuit, as required by the temperature of the battery.

A great number of batteries can evidently be suspended in a string from one sounding balloon, since the upright position of the string will always result in a low collision impact action of the generator against a colliding aircraft.

According to a further embodiment of the invention as shown in FIGURES 6–9 in the drawings, an electrochemical generator G essentially comprises an assembly 102 of electrode strips provided with separators impregnated with electrolyte and contained in a sealed envelope which is wound around the outer wall of a cylinder 104 forming a rigid core made, for example, of foamed polystyrene.

The assembly 102 shown in FIGURE 8 before winding is maintained wound as one turn in the groove 113 of a pulley-shaped core 104. To hold the assembly 102 tightly wound, a flexible resistant strip 20 is tightened around the assembly 102. This strip 20 may be made of a flexible sheet of fiber glass fabric, advantageously coated with adhesive plastic material, which is wound, for example, in one and a half or two turns so that the assembly 102 is pressed firmly against the cylinder 104. Advantageously, the strip 20 comprises an adhesive side so that the coil is easily tightened by the winding of strip 20 and is kept in that state thereby.

FIGURE 7 more particularly shows the disposition of the various layers in the encircled zone VII in FIGURE 6. Thus, core 104, inner wall 108 of the sealed envelope of cell 102, insulating porous strip 107b providing electrolyte storage, positive electrode strip 105, separator strip 107, negative electrode strip 106, insulating porous strip 107a providing electrolyte storage, outer wall of sealed envelope 108 and flexible resistant strip 20 may successively be seen in that figure.

In FIGURE 8, it may be seen that the cell assembly 102 is essentially initially shaped as a rectangular, flat bag-like structure whose walls 108 form the aforesaid sealed envelope, the width W of the bag substantially corresponding to the height $h$ of the groove 113 of core 104, and the length L of the bag-like structure substantially corresponding to the perimeter of the groove 113.

In the same FIGURE 8, it may be seen that the two leads 21, 22 constituting the respective terminals of the electrodes of cell 102, respectively are connected to the respective electrode plates 106 and 105 of opposite polarities of the generator and protrude in sealed relationship from the bag forming the envelope of the cell 102 in the vicinity of the two opposite longitudinal ends at two opposite sides so that these leads or connectors 21 and 22 are located at and project from opposite ends of core 104 (FIG. 9) after the assembly has been wound. Such an assembly can be advantageously realized as described in the French Patent NPV 99,378 filed Mar. 17, 1967 by the applicant's assignee under the title "Perfectionnement aux générateurs électrochimiques étanches" (no corresponding U.S. application). According to this French patent, additional plastic strips are provided at the two opposite lateral ends of the envelope on both sides of leads 21 and 22 and said lateral ends are heat sealed around said leads so that reinforced seams are produced around said leads. This method produces a hermetic seal around the leads. Advantageously, slots 23 and 24 are provided in the respective end flanges 114 and 115 of the core 104 providing passages for the leads 21 and 22 as shown in FIGURE 9.

In order to aid in stacking and fitting successive generators G, in axial alignment, each core 104 is advantageously provided at its respective axial ends, on one with a crown or collar 112 of relatively small outer diameter and on the other with a central hollow 116 having an inner diameter substantially corresponding to the outer diameter of a crown 112.

Thus, when successive generators G are piled up, the crown 112 of the lower cell fits into the hollow 116 of the adjacent upper cell, and mating surfaces may be adhered together. For series connection, a lead 21 of the lower generator cell is electrically connected to the lead 22 of the upper generator in any desired way.

It may be seen that the manufacture and assembly of such generators G connected in series are very easy. Especially, juxtaposition and fitting of several generators does not involve any major difficulty and connection is simply made by joining adjacent connectors of adjacent generators such as 21 and 22. In addition, when the sealed envelope 108 is made, for example, of a plastic material that is readily welded such as "Rilsan" polyamid, the mass production of assemblies 102 involves no difficulties, nor does the sealing of their protruding off leads 21, 22. Advantageously, such leads or terminals may be made of flexible expanded metal such as nickel.

Compared to the first described embodiment, the replacement of the rigid outer cylinder 3 thereof made of foamed material by the tight flexible resistant strip 20 more especially results in the following advantages:

It provides:

Important decrease of the weight, therefore, of the partial mass concerned in an impact with an aircraft, so that the generator is still more harmless;

Gain in manufacturing time since it is no longer necessary to fasten the cell to the inner core, then to insert this unit into a mold and to wait until the material constituting the external cylinder 3 has foamed and cooled;

A possibility of fast dismantling and rebuilding of any individual faulty generator detected during late checkings.

Many modifications may be effected in the last-described embodiment. More particularly, the flexible resistant strip 20 may be replaced by a ring of plastic material having the same mechanical characteristics in use.

Alternatively, hooping may be effected by means of a stretched strip whose ends are joined together permanently to form an elastic band.

In such conditions, the assembly 102 will be kept under definite pressure around the rigid inner core 104.

The core 104 may also be constituted by a smooth cylinder with detachable end flanges or rims that are fastened onto it after the generator assembly has been put into place thereon.

While specific embodiments of the invention have been described and shown, variations in structural detail within in the scope of the appended claims are possible and are contemplated. There is no intention, therefore, of limitation to the exact abstract or disclosure hereinabove presented.

What is claimed is:

1. An electrochemical generator for producing electricity having low collision impact action comprising a synthetic rigid foam core of low specific density, a sealed electrochemical electrical generator cell wrapped around and mounted on said core and a surrounding outer cover means closely engaging and surrounding said cell and maintaining its component in intimate compressed contact.

2. An electrochemical generator according to claim 1, wherein said cell comprises at least one flexible positive plate-like electrode, at least one flexible negative plate-like electrode, sheet-like separator material between said electrodes, electrolyte and a flexible sealed envelope of synthetic plastic material surrounding and enclosing said electrodes, separator material and electrolyte, and leads connected to said electrodes and extending outwardly of said envelope and being in sealed relationship therewith.

3. An electrochemical generator according to claim 1, wherein said outer cover also comprises a frame of synthetic rigid foam material of low specific density like that of said core.

4. An electrochemical generator according to claim 3 wherein said foam core and said foam cover are concentrically disposed.

5. An electrochemical generator according to claim 3 wherein said foam core and said foam cover are concentrically disposed and offset in the axial direction relative to each other to provide respectively a recess at one end and a projection at the other end so that a plurality of such generators may be interfitted and stacked together in axial alignment.

6. An electrochemical generator according to claim 2 wherein said leads from the respective electrodes project outwardly from opposite edges of said sealed envelope.

7. An electrochemical generator according to claim 1, wherein said outer cover means comprises a securing band wound around the sealed cell to secure it and its contents on said foam core.

8. An electrochemical cell according to claim 1, wherein said core has cylindrical spool-like configuration with end rims defining a annular recess and wherein said cell is positioned in said recess and wherein said outer cover comprises a band-like member mounted around the positioned cell to retain it securely within said recess.

9. An electrochemical generator according to claim 8 wherein said core has a projection at one end and a complementary recess at its other end to facilitate stacking an interfitting of a plurality of such generators in their axial directions.

10. An electrochemical generator according to claim 8, wherein said band is of flexible material having adhesive on one face for securing it to said cell.

11. An electrochemical generator according to claim 2 wherein said envelope is of synthetic plastic material selected from the group consisting of PVC, polyethylene and polyamid.

12. An electrochemical generator according to claim 3 wherein said core and cover means are both of synthetic material selected from the group consisting of polyurethane and polystyrene foams.

13. An electrochemical generator according to claim 2 wherein said plate-like electrodes respectively are sintered metal carriers impregnated with respective positive and negative active materials.

14. An electrochemical generator according to claim 2 wherein said plate-like electrodes respectively are felted fabric carriers impregnated with respective positive and negative active materials.

15. An electrochemical generator according to claim 8, wherein said end rims have recesses for respective leads from said cell.

16. An electrochemical generator according to claim 8 wherein said cell comprises positive and negative electrode strips with interposed separator means and electrolyte and a sealed envelope therefor of synthetic plastic material of substantially rectangular shape whose width substantially corresponds to the length of said annular recess of said core and whose length approximately corresponds to the perimeter of said recess.

17. An electrochemical generator according to claim 16 including leads connected to respective electrodes and projecting respectively from opposite edges of said envelope adjacent opposite ends of said core, said leads being sealed into the envelope at their exits therefrom.

18. An electrochemical generator according to claim 1, including electrical heating means for said cell, electrical charging means therefor and switching means for interconnecting said charging means automatically to said heating means at determined cell temperatures.

References Cited

UNITED STATES PATENTS 2,346,695    4/1944    Miller _____ 136—173

WINSTON A. DOUGLAS, *Primary Examiner.*

C. F. LE FEVOUR, *Assistant Examiner.*

U.S. Cl. X.R.

136—13, 132